US011157495B2

(12) United States Patent
Kaul et al.

(10) Patent No.: US 11,157,495 B2
(45) Date of Patent: Oct. 26, 2021

(54) DYNAMICALLY MANAGING PREDICATE EXPRESSION COLUMNS IN AN ENCRYPTED DATABASE

(71) Applicant: International Business Machines Corporation, Armonk, NY (US)

(72) Inventors: Akshar Kaul, Karnataka (IN); Gagandeep Singh, Bangalore (IN); Hong Min, Poughkeepsie, NY (US); Manish Kesarwani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/519,489

(22) Filed: Jul. 23, 2019

(65) Prior Publication Data
US 2021/0026851 A1    Jan. 28, 2021

(51) Int. Cl.
  *G06F 16/2453*    (2019.01)
  *G06F 21/60*    (2013.01)
  *G06F 16/2455*    (2019.01)

(52) U.S. Cl.
  CPC .... *G06F 16/24535* (2019.01); *G06F 16/2455* (2019.01); *G06F 21/602* (2013.01)

(58) Field of Classification Search
  None
  See application file for complete search history.

(56) References Cited

U.S. PATENT DOCUMENTS

| 9,275,249 | B1 | 3/2016 | Allen | |
|---|---|---|---|---|
| 2012/0191697 | A1 | 7/2012 | Sherman et al. | |
| 2014/0006382 | A1* | 1/2014 | Barber | G06F 16/24542 707/718 |
| 2016/0283728 | A1* | 9/2016 | Antonopoulos | H04L 9/008 |
| 2017/0031975 | A1* | 2/2017 | Mishra | G06F 16/2282 |

(Continued)

OTHER PUBLICATIONS

Popa et al., CryptDB: Protecting Confidentiality with Encrypted Query Processing, SOSP '11, Oct. 23-26, 2011.
(Continued)

*Primary Examiner* — Christopher J Raab
(74) *Attorney, Agent, or Firm* — Ryan, Mason & Lewis, LLP

(57) ABSTRACT

Methods, systems, and computer program products for dynamically managing predicate expression columns in an encrypted database are provided herein. A computer-implemented method includes dynamically parsing a query into multiple query predicate expressions; determining that one or more of the query predicate expressions require materialization in an encryption scheme compatible with operations in the predicate expressions; comparing (i) an amount of storage capacity to be consumed by materializing the one or more query predicate expressions to (ii) an amount of available storage budget for materialized columns in one or more databases; upon a determination that the amount of storage capacity to be consumed exceeds the amount of available storage budget, removing at least one existing materialized column from the databases; materializing the query predicate expressions by materializing one or more rows required for execution of the query; and executing the query based on the materialized query predicate expressions.

20 Claims, 9 Drawing Sheets

(56) References Cited

U.S. PATENT DOCUMENTS

2017/0344646 A1 11/2017 Antonopoulos et al.
2019/0156051 A1* 5/2019 Beier .................. G06F 21/6236
2019/0220619 A1* 7/2019 Loza .................... G06F 21/602
2019/0332698 A1* 10/2019 Cho .................... G06F 16/2365

OTHER PUBLICATIONS

Tu et al., Processing Analytical Queries over Encrypted Data, Proceedings of the VLDB Endowment, vol. 6, No. 5, 2013.
Arasu et al., Engineering Security and Performance with Cipherbase, Bulletin of the IEEE Computer Society Technical Committee on Data Engineering, 2012.
Bajaj et al., TrustedDB: A Trusted Hardware based Database with Privacy and Data Confidentiality, SIGMOD'11, Jun. 12-16, 2011.
wikipedia, Materialized View, https://en.wikipedia.org/w/index.php?title=Materialized_view&oldid=889533897, Mar. 26, 2019.

* cited by examiner

DYNAMICALLY MANAGING PREDICATE EXPRESSION COLUMNS IN AN ENCRYPTED DATABASE

FIELD

The present application generally relates to information technology and, more particularly, to data management techniques.

BACKGROUND

Many cloud vendors provide a Database-as-a-Service (DBaaS) offering, and enterprises commonly use DBaaS for database needs. In such DBaaS offerings, encryption is typically provided by the cloud vendors, creating operational challenges for users. Accordingly, some conventional data management approaches include using searchable encryption schemes, which allow particular operations to be carried out over the encrypted data in the databases. However, in such conventional approaches, many queries cannot be supported over an encrypted database.

SUMMARY

In one embodiment of the present invention, techniques for dynamically managing predicate expression columns in an encrypted database are provided. An exemplary computer-implemented method includes dynamically parsing a query into multiple query predicate expressions, and determining that one or more of the multiple query predicate expressions require materialization in an encryption scheme compatible with operations in the predicate expressions, wherein determining is based at least in part on metadata pertaining to one or more additional queries. Such a method also includes comparing (i) an amount of storage capacity to be consumed by materializing the one or more query predicate expressions to (ii) an amount of available storage budget for materialized columns in one or more databases. Also, upon a determination that the amount of storage capacity to be consumed by materializing the one or more query predicate expressions exceeds the amount of available storage budget, the method includes removing at least one existing materialized column from the one or more databases. Further, such a method additionally includes materializing the one or more query predicate expressions, wherein materializing comprises materializing one or more rows required for execution of the query, and executing the query based at least in part on the one or more materialized query predicate expressions.

In another embodiment of the invention, an exemplary computer-implemented method includes dynamically parsing a fallback query into multiple query predicate expressions, transforming the multiple query predicate expressions into multiple database columns, and determining one or more of the multiple database columns which require materialization in an encryption scheme compatible with operations in the predicate expressions, wherein determining is based at least in part on metadata pertaining to one or more additional queries. Also, such a method includes comparing (i) an amount of storage capacity to be consumed by materializing the one or more database columns to (ii) an amount of available storage budget for materialized columns in one or more databases. Additionally, upon a determination that the amount of storage capacity to be consumed by materializing the one or more database columns exceeds the amount of available storage budget, the method includes removing at least one existing materialized column from the one or more databases. Further, such a method includes materializing the one or more database columns, populating, with data, one or more rows of the one or more materialized columns, wherein the one or more rows are required for execution of the fallback query, and executing the fallback query based at least in part on the one or more populated materialized database columns.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
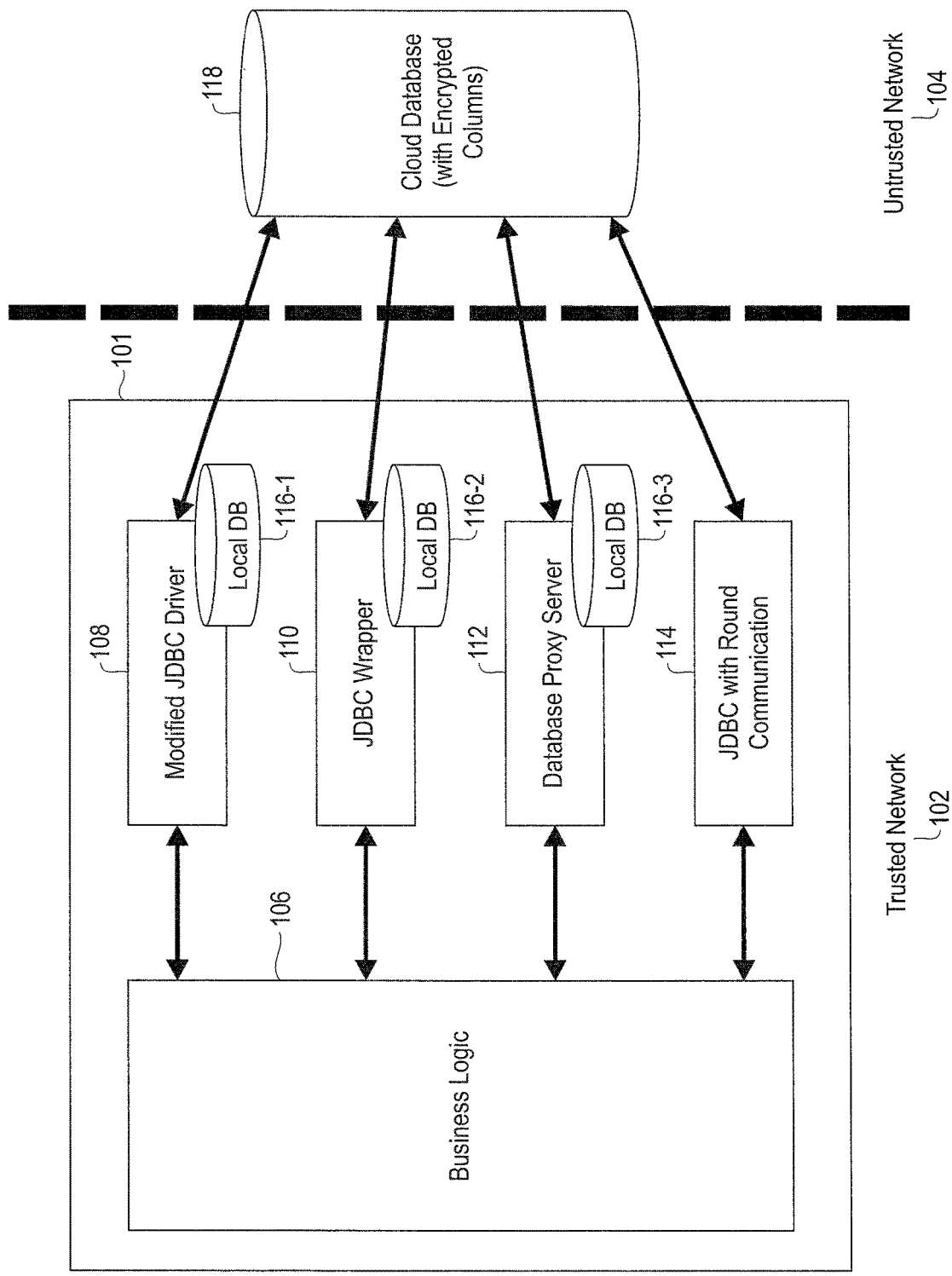
FIG. 1 is a diagram illustrating system architecture, according to an exemplary embodiment of the invention.

As described herein, an embodiment of the present invention includes dynamically managing predicate expression columns in an encrypted database. At least one embodiment includes dynamically materializing columns (full columns and/or partial columns) in a cloud-encrypted database to handle execution of fallback queries. Various enterprises use searchable encryption to encrypt data before uploading the data to a cloud-based DBaaS which is hosted and managed by a cloud vendor. The searchable encryption allows enterprises to support various types of queries directly on the encrypted database. However, there are queries which cannot be supported directly over such encrypted databases. Such queries are referred to herein as fallback queries. For example, suppose that an enterprise stores a table item in a DBaaS having the following columns: (i) "Name," encrypted using a deterministic encryption scheme; (ii) "Price," encrypted using a deterministic encryption scheme; and (iii) "Discount," encrypted using a deterministic encryption scheme.

The above schema can handle queries containing equality predicates only, such as, for example, "select name from item where price=10." However, the following query, "select name from item where price*discount=10," cannot be supported directly over the encrypted database. Accordingly, this is an example of a fallback query. To execute the above fallback query, an enterprise can use the following strategy: (i) Create a new column in the encrypted table (referred to, for example, as matColumn1); (ii) Execute a structured query language (SQL) query to obtain the price and discount from all rows of the item table at the client machine. The client machine will obtain an encrypted price and discount; (iii) Decrypt the price and discount to obtain a plain text price and discount; (iv) Compute a value (v)=plain text price*plain text discount; and (v) Encrypt v using a deterministic encryption scheme and store in the matColumn1.

This process of creating a new column in the encrypted database at the cloud and populating it with values of interest is referred to herein as materialization. Once the matColumn1 has been materialized, the fallback query can be transformed to "select name from item where matColumn1=10." Materialization is one of the ways in which the fallback queries can be handled. Other ways to handle feedback queries can include, for example: (i) Obtaining the data at the client machine, decrypt and execute the query on the decrypted database; and (ii) Executing a single query in multiple rounds with the cloud, wherein in each round, the client helps the cloud by performing operations on the encrypted values which the server cannot.

Such an embodiment includes dynamically parsing a query to identify one or more query predicate expressions and/or one or more sub-expressions of the query predicate expression which require materialization in an encryption scheme. Additionally, such an embodiment also includes dynamically determining which columns to materialize based at least in part on the query or queries, materializing the identified columns on a need basis, and dynamically removing the columns (from the encrypted database) when a storage budget is exceeded.

Accordingly, one or more embodiments include determining and/or identifying one or more predicate expressions which can be (or are already) materialized at a database server. The decision as to whether a predicate expression should be materialized or not can be carried out based at least in part on the metadata which are stored about the materialized column(s) and predicate expression(s). If materializing a new column for a predicate expression will cause a storage budget to be exceeded, one or more of the (already) materialized columns are deleted to free-up space.

Fallback queries having predicates with an expression that is already materialized can be executed directly at the database server. Additionally, the materialized columns are created, populated, and/or deleted dynamically based on incoming queries. In one or more embodiments, incoming queries are parsed to determine which (if any) predicate columns to materialize. The metadata and statistics pertaining to the predicate expression(s) and materialized columns are maintained, and available for subsequent use in deciding which predicate expression(s) should be materialized.

For materialized columns, the rows can be populated on a need basis. In at least one embodiment, only those rows of materialized columns which are required for a current query are populated, which minimizes the work required for executing the current query. Also, materializing the columns enables reusing the work done for one query for future queries.

As noted herein, when the storage budget (attributed to a given user and/or data owner) allocated for materialized columns is exceeded, one or more of the (already) materialized columns can be deleted to free-up space. Also, in at least one embodiment, the metadata pertaining to materialized columns are updated to reflect such deletions. The system determines the columns to be deleted based on the statistics maintained about the materialized columns. When the system has to choose a materialized column for deletion, the system calculates a score for each of the materialized columns, wherein the score is based on the amount of storage used by the given materialized column, the frequency of usage of the given materialized column, the number of times that the given materialized column was used recently, etc. Once the scores have been calculated, the system deletes the materialized column having the lowest score. The materialized columns are deleted until the required storage is available. A single query can use multiple materialized columns. Also, during deleting, the system ensures that the materialized columns used by the current query are not deleted.

FIG. 1 is a diagram illustrating system architecture, according to an embodiment of the invention. By way of illustration, FIG. 1 depicts a trusted network 102 and an untrusted network 104. The untrusted network 104 includes a cloud database 118 with encrypted columns, while the trusted network includes a dynamic data management system 101. The dynamic data management system 101 includes business logic 106, a modified Java database connectivity (JDBC) driver 108 (connected to local database (DB) 116-1), a JDBC wrapper 110 (connected to local database 116-2), a database proxy server 112 (connected to local database 116-3), and a JDBC component with round communication 114. As used herein, round communication refers to a strategy for handling fallback queries. In such a strategy, a single query is executed in multiple rounds with the cloud resident encrypted database. In each round, the client and the server interact to perform one or more operations on the encrypted values (stored at the server). In the final round, the output of the query is returned by the cloud.

As also depicted in FIG. 1, the modified JDBC driver 108, JDBC wrapper 110, database proxy server 112, and a JDBC component with round communication 114 all interact with the business logic 106 and the cloud database 118.

As illustrated and detailed, FIG. 1 depicts the system architecture used when an enterprise uses searchable encryption. The system business logic 106 is hosted on the trusted network 102. The enterprise data are stored in the cloud database 118 in an untrusted network 104. The system business logic 106 is agnostic to the searchable encryption being used to encrypt the data stored in the cloud database 118. Additionally, the system business logic 106 can access the cloud database 118 via following methods: (i) Via the modified JDBC driver 108 with local database 116-1 for handling fallback queries; (ii) Via JDBC wrapper 110 with local database 116-2 for handling fallback queries; (iii) Via database proxy server 112 which has local database 116-3 for handling fallback queries; and (iv) Via JDBC wrapper which uses round communication 114 for handling fallback queries. A particular business logic system may use one or more of these methods to access the cloud database 118. As further detailed below, FIGS. 2, 3, 4, and 5 provide depictions of these database access methods and how the query predicate expressions are materialized in each case.

Accordingly, in one or more embodiments, the dynamic data management system 101 is hosted in a trusted network 102, such as within an organization (logically) or enterprise, on-premise of an enterprise, and/or in the private cloud of an enterprise. In such an example embodiment, portions of enterprise data are stored in a cloud database 118 in an untrusted network. Additionally, searchable encryption is transparent to the system business logic 106, and the encryption is carried out at the database access level via the modified JDBC driver 108, the JDBC wrapper 110, the database proxy server 112, and/or the JDBC component with round communication 114. As further detailed herein, one or more embodiments, such as depicted in FIG. 1, include implementing a fallback query execution method using one or more local databases (collectively referred to herein as local databases 116) and using round communication (e.g., via component 114). Such a method enables the system 101 to encrypt selective columns (within the cloud database 118) using a set of one or more encryption schemes.

Figure 2:
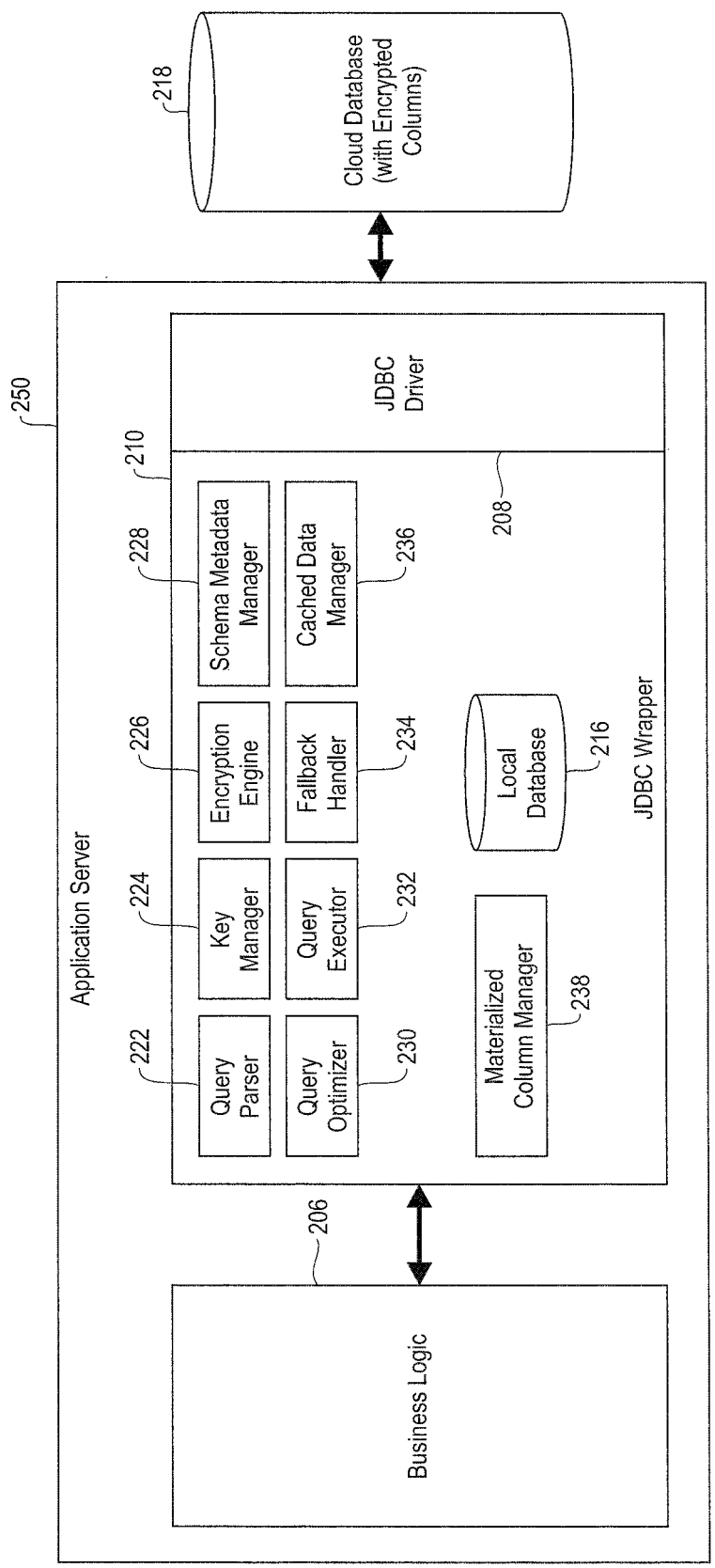
FIG. 2 is a diagram illustrating system architecture, according to an exemplary embodiment of the invention.

FIG. 2 is a diagram illustrating system architecture, according to an embodiment of the invention. Specifically, FIG. 2 illustrates system architecture when business logic 206 in an application server 250 uses a JDBC wrapper 210 to access a cloud-resident database 218. The JDBC wrapper 210 uses a JDBC driver 208 to communicate with the cloud-resident database 218, and the JDBC wrapper 210 uses a local database 216 to handle fallback queries. This local database 216 is hosted in a trusted network and can thus be used to store plain text data. Additionally, the JDBC wrapper 210 of FIG. 2 materializes query predicate expressions in the cloud-resident database 218.

Application server 250 (much like application server 350 in FIG. 3, application server 450 in FIG. 4, and application server 550 in FIG. 5) represents a similar application server as depicted via component 101 in FIG. 1.

Referring again to FIG. 2, the application server 250 includes business logic 206, which interacts with JDBC wrapper 210 and JDBC driver 208. The JDBC wrapper 210 includes a query parser 222, a key manager 224, an encryption engine 226, a schema metadata manager 228, a query optimizer 230, a query executor 232, a fallback handler 234, a cached data manager 236, a materialized column manager 238, and local database 216.

The query parser 222 performs a lexical analysis of incoming queries, the key manager 224 manages the encryption keys used for encryption, the encryption engine 226 is responsible for encrypting and decrypting data, and the schema metadata manager 228 manages the metadata pertaining to the database schema and includes encryption schemes used to encrypt each column, key labels for encryption keys, etc. Additionally, the fallback handler 234 handles the execution of fallback queries, and the cached data manager 236 handles the data stored in the local database 216, wherein the local database 216 can include a database engine hosted in the trusted network. Further, the query optimizer 230 transforms an input query into various parts that are subsequently executed to obtain and/or determine the final result set. Also, the query optimizer 230 determines and/or decides the order of predicate evaluation, which in turn effects the materialization of various columns.

As also depicted in FIG. 2, the query executor 232 executes the transformed query output by the query optimizer 230. In one or more embodiments, such execution involves the creation of one or more new columns representing the query predicate expression, materialization of the required rows in the columns representing the query predicate expression, query execution involving use of the columns representing the query predicate expression, etc. Additionally, the materialized column manager 238 determines and/or maintains statistics which are used to decide which column representing the query predicate expression should be materialized, as well as information pertaining to which columns representing the query predicate expressions are materialized. The materialized column manager 238 also manages (e.g., keeps track of the workload on the database) connection workloads and materializes columns representing the query predicate expression in the background when usage is less significant.

Figure 3:
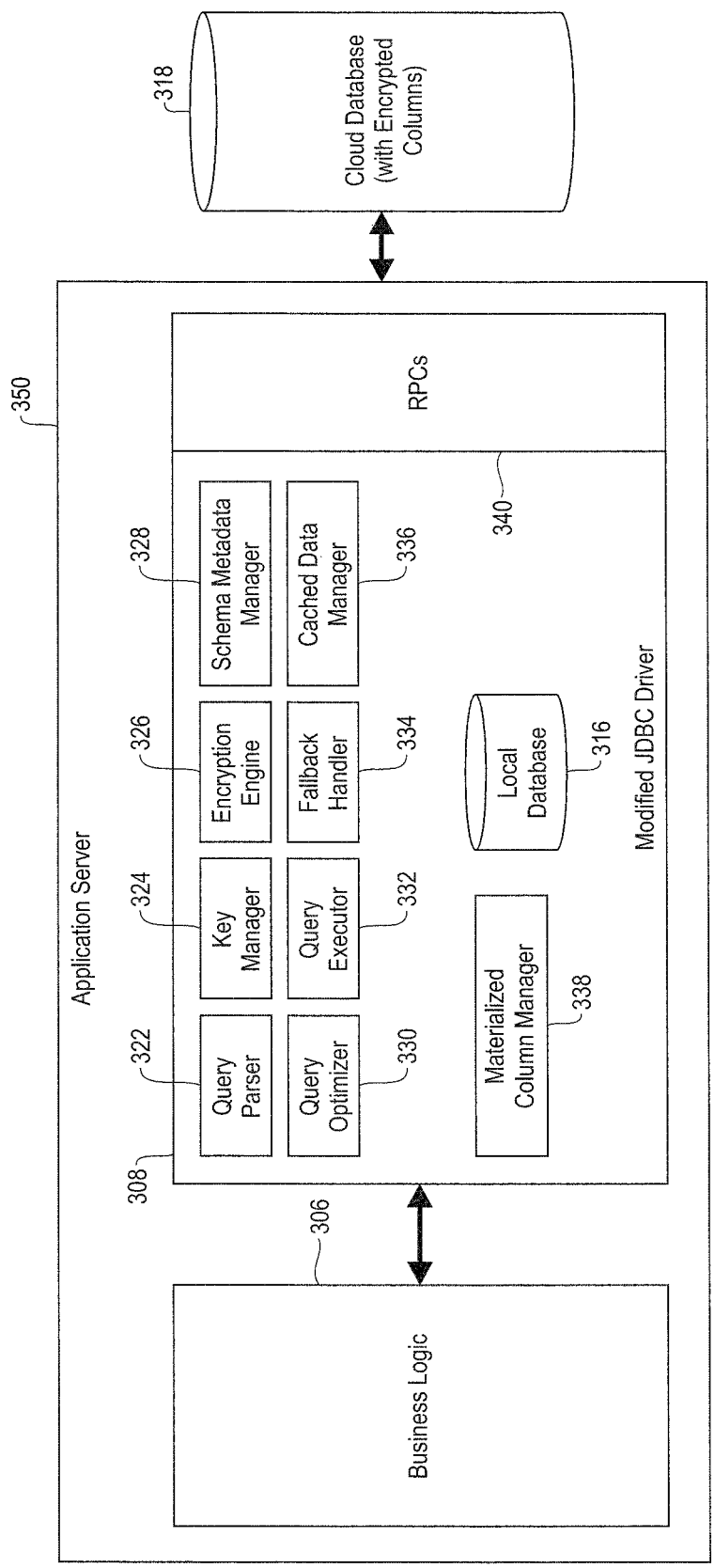
FIG. 3 is a diagram illustrating system architecture, according to an exemplary embodiment of the invention.

FIG. 3 is a diagram illustrating system architecture, according to an embodiment of the invention. Specifically, FIG. 3 illustrates system architecture when business logic 306 in an application server 350 uses a modified JDBC driver 308 to access a cloud-resident database 318. With respect to the modified JDBC driver 308, the source code of a standard JDBC driver for a database is modified such that the driver supports searchable encryption and materialization of columns representing query predicate expressions. The modified JDBC driver 308 uses remote procedural calls (RPCs) 340 to communicate with the cloud-resident database 318, and the modified JDBC driver 308 uses a local database 316 to handle fallback queries. This local database 316 is hosted on a trusted network and can thus be used to store plain text data. Additionally, the modified JDBC driver 308 of FIG. 3 materializes query predicate expressions in the cloud-resident database 318.

By way of illustration, FIG. 3 depicts application server 350 interacting with cloud database 318 (with encrypted columns). As depicted, the application server 350 includes business logic 306, which interacts with a modified JDBC driver 308, which in turn uses RPCs 340 to communicate with the cloud resident database 318. The modified JDBC driver 308 includes, similar to the JDBC wrapper 210 depicted in FIG. 2, query parser 322, key manager 324, encryption engine 326, schema metadata manager 328, query optimizer 330, query executor 332, fallback handler 334, cached data manager 336, materialized column manager 338, and local database 316.

Figure 4:
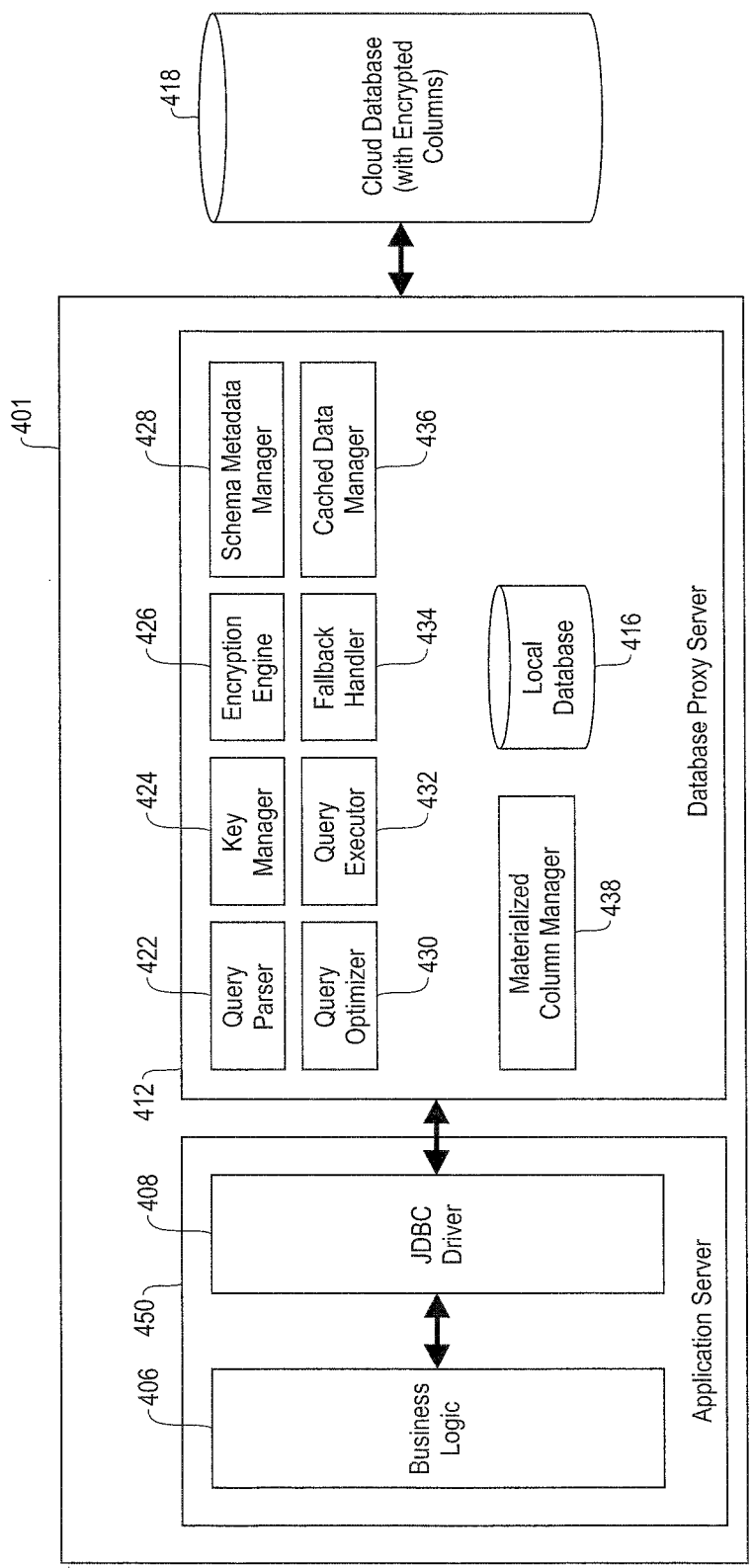
FIG. 4 is a diagram illustrating system architecture, according to an exemplary embodiment of the invention.

FIG. 4 is a diagram illustrating system architecture, according to an embodiment of the invention. Specifically, FIG. 4 illustrates system architecture when business logic 406 in an application server 450 uses a database proxy server 412 to access a cloud-resident database 418. The business logic 406 uses, in part, a JDBC driver 408 for accessing the database 418, and the communication between the JDBC driver 408 and the cloud-resident database 418 is intercepted by the database proxy 412 (this can be done, for example, via an overall system configuration wherein the application server 406 may not be aware that it is communicating with the database proxy 412).

The database proxy 412 ensures that the searchable encryption scheme is used while storing data at the cloud-resident database 418, and also ensures that queries are transformed according to the encryption schemes used and that the result set sent back to the JDBC driver 408 is decrypted appropriately. The database proxy 412 can use various methods internally to communicate with the cloud-resident database 418, wherein such methods can include, for example, a standard JDBC driver, RPCs, etc. The database proxy 412 uses a local database 416 to handle fallback queries, wherein this local database 416 is hosted on a trusted network and can thus be used to store plain text data. Additionally, the database proxy 412 materializes query predicate expressions in the cloud-resident database 418, and the database proxy server 412 is also hosted on a trusted network. The application server 450 is agnostic to whether the database proxy 412 is using searchable encryption or not. Also, the application server 450 and database proxy server 412 can be hosted on different machines, but they both will be hosted within the same trusted network. This architecture requires no changes to the application server 450, and hence, can be advantageous when the code for the application server 450 is not available or cannot be easily modified.

Referring again to the illustration, FIG. 4 depicts dynamic data management system 401 interacting with cloud database 418 (with encrypted columns). As depicted, the dynamic data management system 401 includes application server 450, which includes business logic 406 and JDBC driver 408. The business logic 406 interacts with JDBC driver 408, which in turn interacts with database proxy server 412. The database proxy server 412 includes, similar to the JDBC wrapper 210 depicted in FIG. 2 and the modified JDBC driver 308 in FIG. 3, query parser 422, key manager 424, encryption engine 426, schema metadata manager 428, query optimizer 430, query executor 432, fallback handler 434, cached data manager 436, materialized column manager 438, and local database 416.

Figure 5:
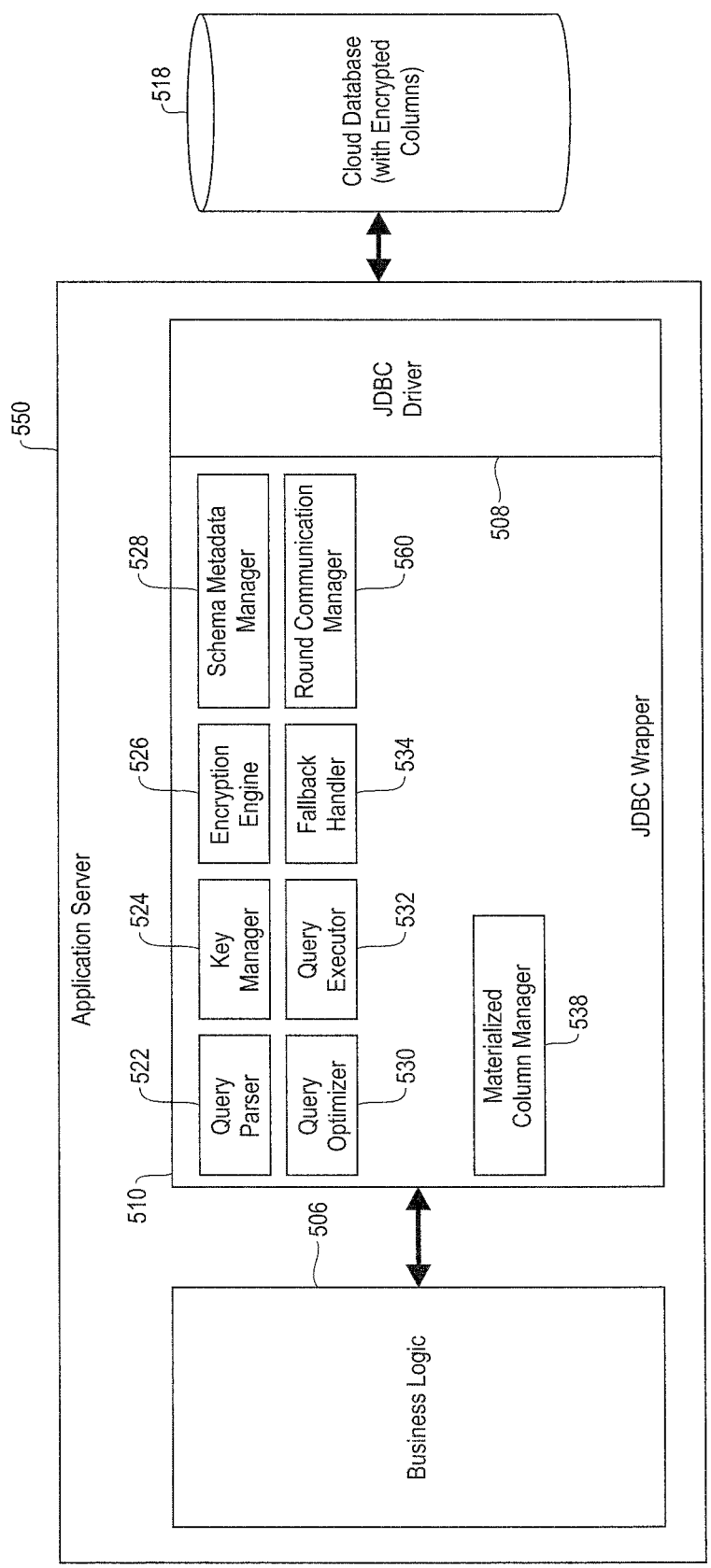
FIG. 5 is a diagram illustrating system architecture, according to an exemplary embodiment of the invention.

FIG. 5 is a diagram illustrating system architecture, according to an embodiment of the invention. Specifically, FIG. 5 illustrates system architecture when business logic 506 in an application server 550 uses a JDBC wrapper 510 to access a cloud-resident database 518. The JDBC wrapper 510 uses a JDBC driver 508 to communicate with the cloud-resident database 518, and the JDBC wrapper 510 also uses round communication to handle fallback queries. In an example embodiment such as depicted in FIG. 5, when a fallback query is to be executed, the JDBC wrapper 510 executes the fallback query in various rounds with the cloud-resident database 518, and also materializes query predicate expressions in the cloud-resident database 518.

Referring again to the illustration, FIG. 5 depicts application server 550 interacting with cloud database 518 (with encrypted columns). As depicted, the application server 550 includes business logic 506, which interacts with JDBC wrapper 510 and JDBC driver 508. The JDBC wrapper 510 includes, similar to the JDBC wrapper 210 depicted in FIG. 2, the modified JDBC driver 308 in FIG. 3, and the database proxy server 412 in FIG. 4, query parser 522, key manager 524, encryption engine 526, schema metadata manager 528, query optimizer 530, query executor 532, fallback handler 534, and materialized column manager 538. As depicted in FIG. 5, the JDBC wrapper 510 in FIG. 5 also includes a round communication manager 560, which handles fallback queries when round communication is used.

By way of illustration, consider the following use case implementation of an example embodiment. Assume that an application issues a query. The query is processed by a database access layer to determine whether the query is a fallback query. If the query is not a fallback query, at least one embodiment includes transforming the query and executing the transformed query on the cloud database. If the query is a fallback query, such an embodiment includes parsing and transforming the query into (i) a column creation query which will create the required number of columns wherein each column represents a query predicate expression, (ii) a set of column materialization steps, and (iii) a set of queries to be executed to obtain the final result set. In one or more embodiments, the set of column materialization steps includes a set of select and insert queries which will populate the columns, which represent query predicate expressions, and are used by the underlying fallback query. These set of select and insert queries will require a client-side computation to compute the values to be inserted in the materialized columns. Also, the above-noted set of queries to be executed to obtain the final result set can use the appropriate materialized columns for query predicate expressions. Additionally, this set of queries can use an appropriate fallback mechanism (local database or round communication, etc.) if some query in the set is a fallback query. The above-noted query parsing includes determining that the query is syntactically and semantically valid, which requires checking that the query follows all rules of SQL, the table and column names in the query are valid, all operations are used correctly, etc. Once the query passes all such checks, then a parse tree is generated to identify all of the columns and tables that the query needs, and their relationship with the output.

Subsequently, a query executor (such as depicted, for example, in FIGS. 2-5) executes the transformed query. If the storage budget (attributed to the user and/or data owner) is exceeded in connection with executing this query, at least one embodiment includes determining a materialized column (in the cloud database) to remove and/or delete. During query execution, if the query executor finds that the storage budget allocated for the materialized columns is being exceeded, then the query executor will determine a materialized column (in the cloud resident database) to be deleted. The determined and/or identified materialized column is then removed and one or more statistics are updated, and this process is repeated until the storage budget allocated for the materialized columns is not exceeded.

As noted above and further herein, one or more embodiments include transforming queries. Transforming queries includes obtaining all predicate expressions from the query and dividing the predicate expressions into categories that include (i) supported, (ii) materialized, and (iii) not materialized. In one or more embodiments, the predicate expressions are divided into "supported" and "not supported" categories based on the encryption scheme of the database columns involved in the predicate expression. If the operators involved with the columns in the predicate expression are compatible with the encryption scheme of the column, then the predicate expression is classified as "supported;" else, the predicate expressions is classified as "not supported." Also, in at least one embodiment, "not supported" predicate expressions are further classified as materialized or not materialized based on whether the predicate expressions have been materialized as part of execution of some previous query. This information is maintained by a materialized column manager (238, 338, 438, and 538 in FIG. 2, FIG. 3, FIG. 4, and FIG. 5, respectively).

For each predicate expression in the not materialized category, at least one embodiment includes determining whether the predicate expression should be materialized, and if so, updating the above-noted categorizations.

Additionally, one or more embodiments include determining and/or selecting an order of evaluating the materialized predicate expressions. For each predicate expression in the chosen order, such an embodiment includes generating and/or adding the following to the transformed query: (i) a column creation query (if not already materialized), (ii) a query to obtain the data for materializing the relevant rows, (iii) a computation to be carried out over the above result set, and (iv) a query to add the computed data to the materialized column. Further, such an embodiment includes transforming the input query by transforming the supported and materialized predicate expressions, and transforming the query using a selected fallback method to handle the predicate expressions categorized as not materialized.

As also noted herein, one or more embodiments include determining and/or deciding whether to materialize one or more predicate expressions. By way of example, for each predicate expression, at least one embodiment includes maintaining the following statistics: the number of queries containing the predicate expression as a full expression, the number of queries containing the predicate expression as part of a larger expression, a flag indicating whether the predicate expression is materialized or not, a flag indicating whether the entire column has been materialized, and an encryption scheme associated with the predicate expression. In one or more embodiments, such statistics are used to decide if a predicate expression which cannot be supported directly over an encrypted database should be materialized or not. If the number of queries crosses a predetermined threshold, then one or more embodiments include materializing the predicate expression. The queries noted in the previous sentence represent the queries issued by the application or user which contained the predicate expression. In deciding whether to materialize an un-supported predicate expression, one or more embodiments include reviewing the count of previous queries which contained the predicate expression. If this count exceeds a predefined threshold, such an embodiment includes deciding to materialize the predicate expression. Also, in one or more embodiments, different thresholds can be utilized for full expressions and sub-expressions. Additionally, the newly-created column can be initialized to null values.

As also detailed herein, one or more embodiments include dynamic materialization of columns. Such an embodiment includes running the query with other predicates evaluated prior to the current point of the query plan, and adding a predicate where the materialized column==null. The result set rows at the client side are obtained, and round communication and/or a local database can be used to compute the required value. The computed value is then inserted into the materialized column. In one or more embodiments, only the required rows are populated, while the other rows are left untouched.

As an example, suppose the table "sales" is stored in a cloud-resident database having the following columns: (i) "ID," which is a primary key to uniquely identify the row, and is stored in plain text; (ii) "Name," which is encrypted using a deterministic encryption scheme; (iii) "Region," which is encrypted using a deterministic encryption scheme; (iv) "Price," which is encrypted using a deterministic encryption scheme; and (v) "Discount," which is encrypted using a deterministic encryption scheme. Continuing with the example, assume that the query issued by a relevant application is as follows: "Select name from sales where region="India" and price*discount=100." This query, in accordance with the example, will be executed as follows: (1) Create a column M1 in "sales" which will represent "price*discount"; (2) Execute query 'select id, price, discount from sales where region=deterministic_encryption ("India") and M1=null'; (3) For each row returned by query in (2), (a) Let rid=id of current row; (b) Compute v=price*discount (this will be done at the client); (c) Compute v1=deterministic_encryption(v); and (d) Execute update sales set M1=v1, where Id=rid; and (4) Execute query 'select name from sales where region=deterministic_encryption("India") and M1=deterministic_encryption(100)'.

Additionally, as noted herein, at least one embodiment includes reusing sub-expressions. By way of example, in such an embodiment, if a full query predicate expression is materialized in a required encryption scheme then such a query predicate expression is used. Otherwise, such an embodiment includes determining and/or identifying sub-expressions of the query predicate expression which are materialized in a required encryption scheme. The sub-expressions in the query expression are then replaced with materialized column. For example, such a query expression can include the following: Select * from an item wherein a+b+c+d=10. In such an embodiment, if a+b and c+d are already materialized to M1 and M2 (in a required encryption scheme), then the query becomes the following: Select * from an item wherein M1+M2=10.

For example, suppose the table T is stored in a cloud-resident database having the following columns: (a) "ID," which is a primary key uniquely identifying the row, and is stored in plain text; (b) "C1," which is encrypted using a deterministic encryption scheme; (c) "C2," which is encrypted using a deterministic encryption scheme; (d) "C3," which is encrypted using a deterministic encryption scheme; and (e) "C4," which is encrypted using a deterministic encryption scheme. Additionally, suppose that the following predicate expressions have been materialized in T: (a) M1, corresponding to C1+C2, and encrypted using an additive homomorphic encryption scheme; and (b) M2, corresponding to C3+C4, and encrypted using an additive homomorphic encryption scheme.

Further assume that both M1 and M2 are fully materialized; that is, their values have been computed and stored for each row of T. This can occur, for example, if the following queries have been previously executed: (a) Select sum(C1+C2) from T; and (b) Select sum(C3+C4) from T.

Also, suppose that the following query is issued by the application/user: Select sum(C1+C2+C3+C4) from T. This query will be transformed to "Select sum (M1+M2) from T," and will be directly executed on the server. If M1 and M2 were not fully materialized, then they would be materialized by executing queries (a) and (b) as follows:

(a) Select ID, C1, C2 from T, wherein M1=null. For each row returned by above query, let rid=ID of current row; compute v=C1+C2 (this will be carried out at the client; compute v1=additive_homomorphic_enc(v); and execute update T set M1=v1, wherein ID=rid.

(b) Select id, C3, C4 from T, wherein M2=null. For each row returned by above query, let rid=ID of current row; compute v=C3+C4 (this will be carried out at the client); compute v1=additive_homomorphic_enc(v); and execute, update T set M2=v1, wherein ID=rid.

At least one embodiment also includes background materializing. Such an embodiment includes maintaining and/or keeping track of a current workload on a client and a server, and if the workload drops below a predetermined threshold, materializing null rows of a materialized column. Additionally, in such an embodiment, the column to be materialized is selected as the column with the maximum frequency, wherein frequency=the sum of the full expression count+the sub-expression count.

Further, as detailed herein, at least one embodiment includes deleting one or more materialized columns. Such an embodiment includes maintaining and/or keeping track of the storage used by the materialized column, and when the storage budget (attributed to the user and/or data owner) is exceeded, removing and/or deleting the materialized column (s) and updating one or more relevant statistics. In determining and/or selecting which column(s) to delete/remove, each column receives a score based on its storage size, its overall frequency, and its usage in the last time window. Accordingly, one or more embodiments include deleting and/or removing the column(s) with the lowest score from the cloud database, and such a removal and/or deletion process is repeated until the storage budget meets or is below the maximum specified limit.

Figure 6:
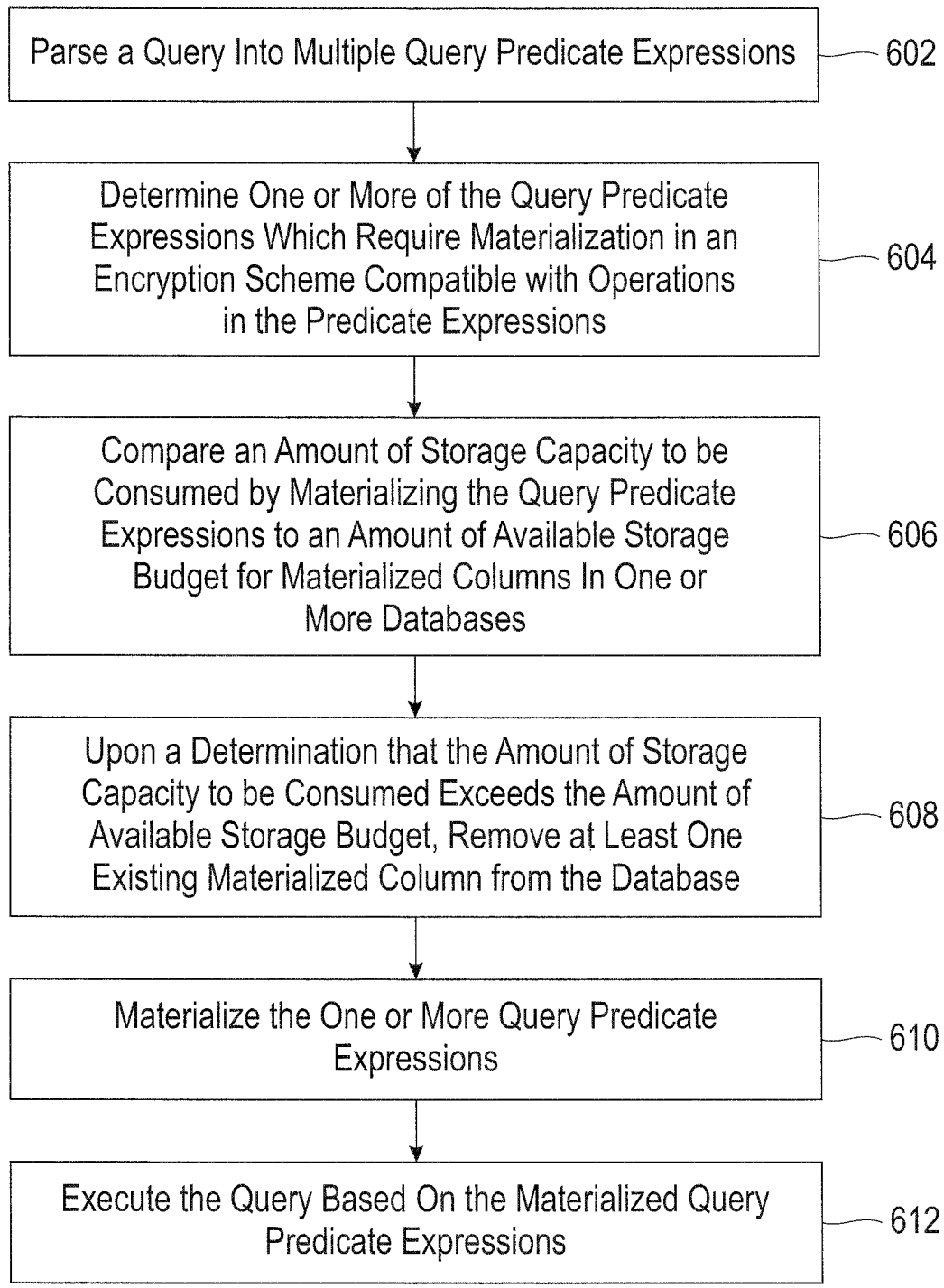
FIG. 6 is a flow diagram illustrating techniques according to an embodiment of the invention.

FIG. 6 is a flow diagram illustrating techniques according to an embodiment of the present invention. Step 602 includes dynamically parsing a query into multiple query predicate expressions. In one or more embodiments, the query can include a fallback query. Additionally, such an embodiment can include determining that the query is a fallback query by analyzing one or more aspects of the query. Further, one or more embodiments can include transforming the multiple query predicate expressions into multiple database columns.

Step 604 includes determining one or more of the multiple query predicate expressions which require materialization in an encryption scheme compatible with operations in the predicate expressions, wherein said determining is based at least in part on metadata pertaining to one or more additional queries. In at least one embodiment, the one or more databases can include one or more cloud-encrypted databases.

Step 606 includes comparing (i) an amount of storage capacity to be consumed by materializing the one or more query predicate expressions to (ii) an amount of available storage budget for materialized columns in one or more databases. Step 608 includes upon a determination that the amount of storage capacity to be consumed by materializing the one or more query predicate expressions exceeds the amount of available storage budget, removing at least one existing materialized column from the one or more databases. Also, at least one embodiment includes updating, in response to the removing step, one or more statistics pertaining to one or more predicate expressions and one or more materialized columns.

Step 610 includes materializing the one or more query predicate expressions, wherein said materializing comprises materializing one or more rows required for execution of the query. Additionally, at least one embodiment includes updating, in response to the materializing step, one or more statistics pertaining to one or more predicate expressions and one or more materialized columns.

Step 612 includes executing the query based at least in part on the one or more materialized query predicate expressions. Also, at least one embodiment includes outputting a response to the query based on said executing as well as reusing the one or more materialized query predicate expressions for one or more future queries.

Also, an additional embodiment of the invention includes dynamically parsing a fallback query into multiple query predicate expressions, transforming the multiple query predicate expressions into multiple database columns, and determining one or more of the multiple database columns which require materialization in an encryption scheme compatible with operations in the predicate expressions, wherein determining is based at least in part on metadata pertaining to one or more additional queries. Also, such an embodiment includes comparing (i) an amount of storage capacity to be consumed by materializing the one or more database columns to (ii) an amount of available storage budget for materialized columns in one or more databases. Additionally, upon a determination that the amount of storage capacity to be consumed by materializing the one or more database columns exceeds the amount of available storage budget, such an embodiment includes removing at least one existing materialized column from the one or more databases. Further, such an embodiment includes materializing the one or more database columns, populating, with data, one or more rows of the one or more materialized columns, wherein the one or more rows are required for execution of the fallback query, and executing the fallback query based at least in part on the one or more populated materialized database columns. Also, in such an embodiment, the above-noted populating can include populating only the one or more rows required for the query. Further, such an embodiment can additionally include reusing the one or more populated materialized columns for one or more future queries.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
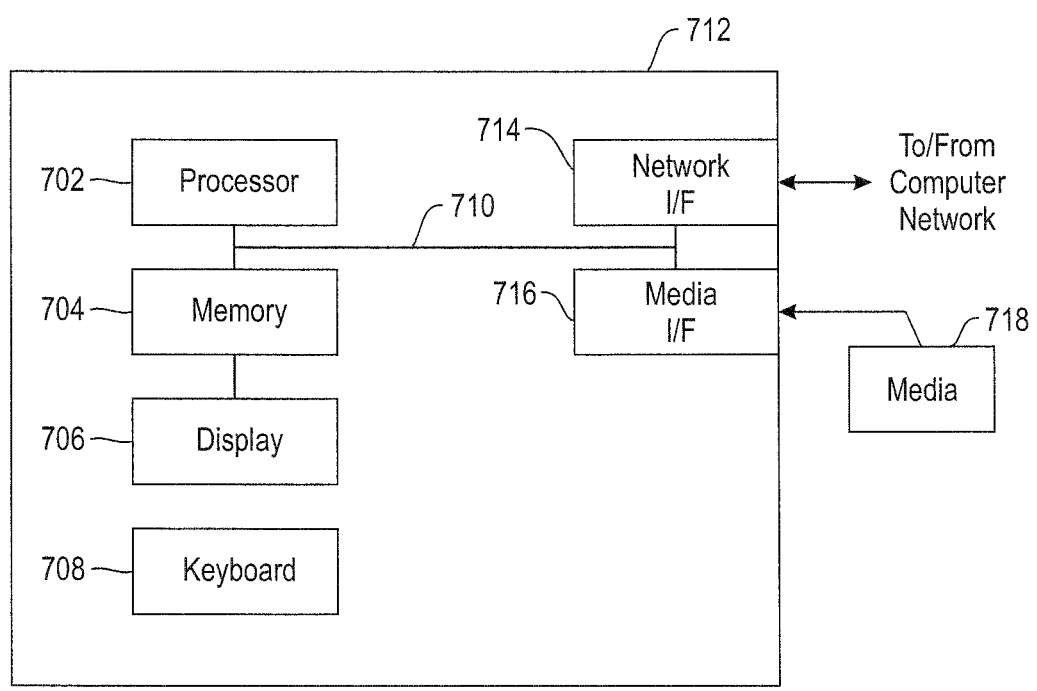
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
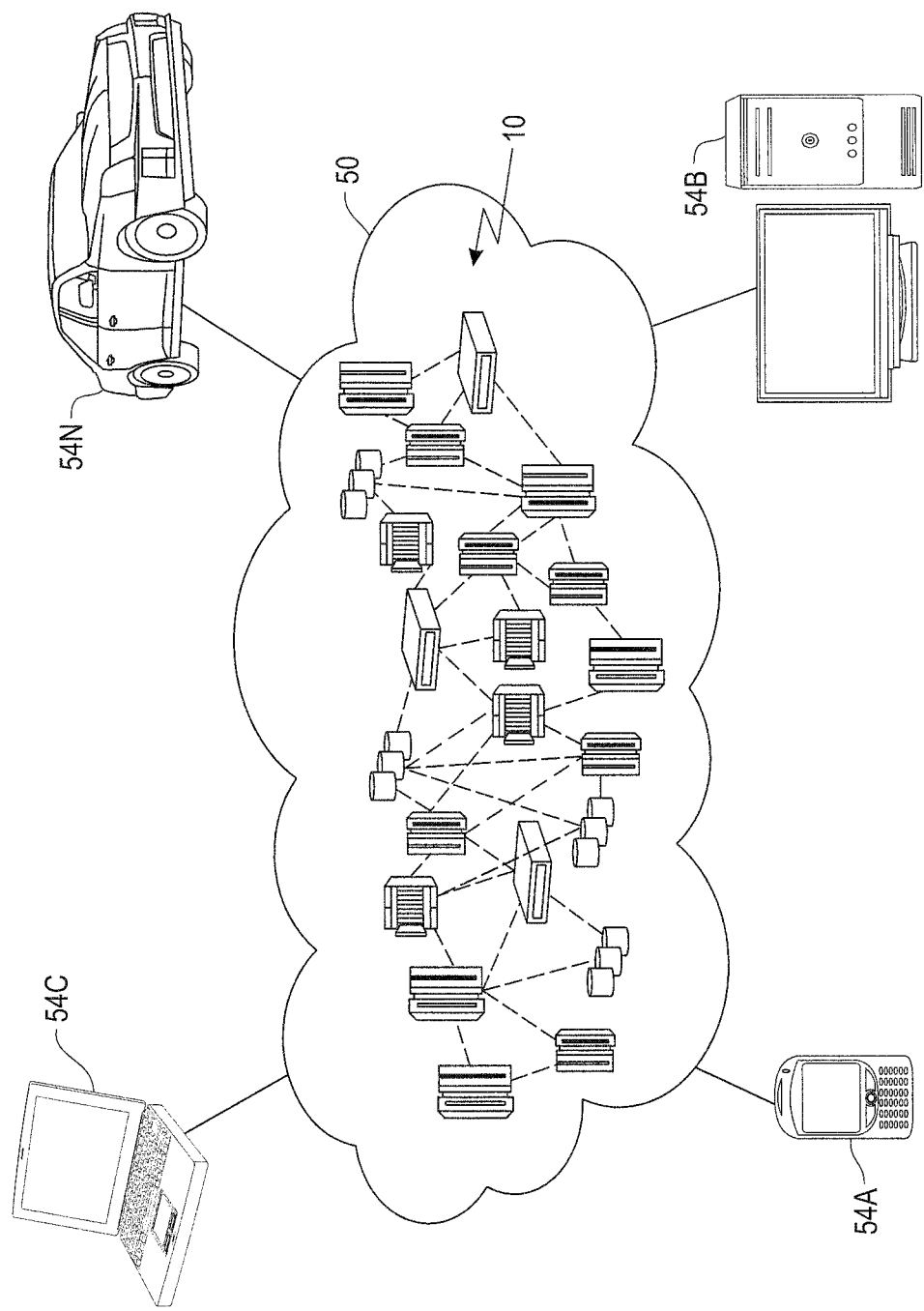
FIG. 8 depicts a cloud computing environment according to an embodiment of the present invention.

Referring now to HG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
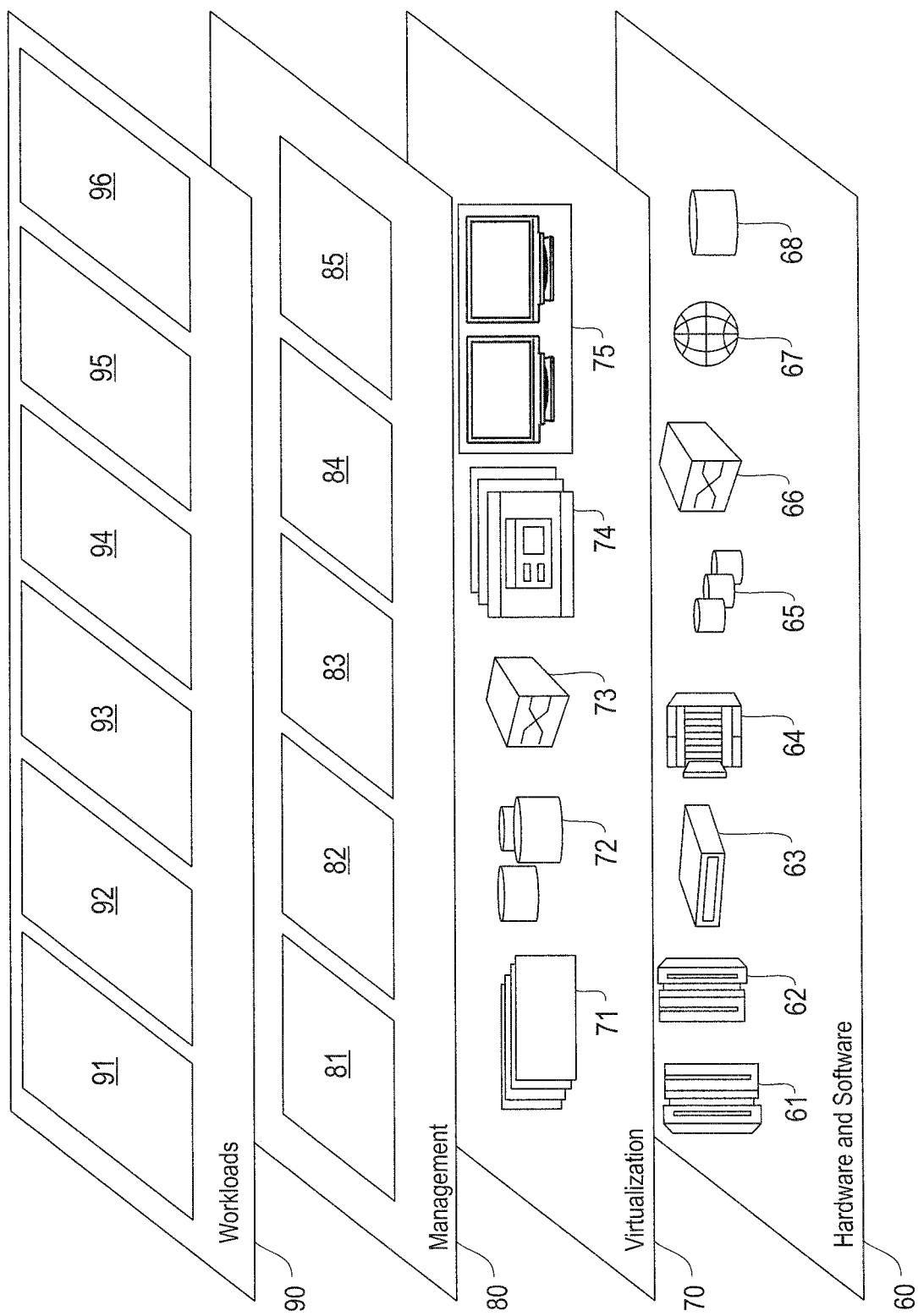
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic predicate expression column management 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, dynamically determining which columns to materialize based on queries, materializing the columns, and removing the columns when a storage budget is exceeded.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

dynamically parsing a query into multiple query predicate expressions;

determining that one or more of the multiple query predicate expressions require materialization in an encryption scheme compatible with operations in the predicate expressions, wherein said determining is based at least in part on metadata pertaining to one or more additional queries;

comparing (i) an amount of storage capacity to be consumed by materializing the one or more query predicate expressions to (ii) an amount of available storage budget for materialized columns in one or more databases;

upon a determination that the amount of storage capacity to be consumed by materializing the one or more query predicate expressions exceeds the amount of available storage budget, removing at least one existing materialized column from the one or more databases;

materializing the one or more query predicate expressions, wherein said materializing comprises materializing one or more rows required for execution of the query; and executing the query based at least in part on the one or more materialized query predicate expressions;

wherein the method is carried out by at least one computing device.

2. The computer-implemented method of claim 1, wherein the query comprises a fallback query.

3. The computer-implemented method of claim 2, comprising:
determining that the query is a fallback query by analyzing one or more aspects of the query.

4. The computer-implemented method of claim 1, comprising:
transforming the multiple query predicate expressions into multiple database columns.

5. The computer-implemented method of claim 1, wherein the one or more databases comprise one or more cloud-encrypted databases.

6. The computer-implemented method of claim 1, comprising:
updating, in response to said removing, one or more statistics pertaining to one or more predicate expressions and one or more materialized columns.

7. The computer-implemented method of claim 1, comprising:
updating, in response to said materializing, one or more statistics pertaining to one or more predicate expressions and one or more materialized columns.

8. The computer-implemented method of claim 1, comprising:
outputting a response to the query based on said executing.

9. The computer-implemented method of claim 1, comprising:
reusing the one or more materialized query predicate expressions for one or more future queries.

10. A computer program product comprising a computer readable storage medium having program instructions embodied therewith, the program instructions executable by a computing device to cause the computing device to:
dynamically parse a query into multiple query predicate expressions;
determine that one or more of the multiple query predicate expressions require materialization in an encryption scheme compatible with operations in the predicate expressions, wherein said determining is based at least in part on metadata pertaining to one or more additional queries;
compare (i) an amount of storage capacity to be consumed by materializing the one or more query predicate expressions to (ii) an amount of available storage budget for materialized columns in one or more databases;
upon a determination that the amount of storage capacity to be consumed by materializing the one or more query predicate expressions exceeds the amount of available storage budget, remove at least one existing materialized column from the one or more databases;
materialize the one or more query predicate expressions, wherein said materializing comprises materializing one or more rows required for execution of the query; and
execute the query based at least in part on the one or more materialized query predicate expressions.

11. The computer program product of claim 10, wherein the program instructions executable by a computing device further cause the computing device to:
transform the multiple query predicate expressions into multiple database columns.

12. The computer program product of claim 10, wherein the one or more databases comprise one or more cloud-encrypted databases.

13. The computer program product of claim 10, wherein the program instructions executable by a computing device further cause the computing device to:
update, in response to said removing, one or more statistics pertaining to one or more predicate expressions and one or more materialized columns.

14. The computer program product of claim 10, wherein the program instructions executable by a computing device further cause the computing device to:
update, in response to said materializing, one or more statistics pertaining to one or more predicate expressions and one or more materialized columns.

15. The computer program product of claim 10, wherein the program instructions executable by a computing device further cause the computing device to:
output a response to the query based on said executing.

16. The computer program product of claim 10, wherein the program instructions executable by a computing device further cause the computing device to:
reuse the one or more materialized query predicate expressions for one or more future queries.

17. A system comprising:
a memory; and
at least one processor operably coupled to the memory and configured for:
dynamically parsing a query into multiple query predicate expressions;
determining that one or more of the multiple query predicate expressions require materialization in an encryption scheme compatible with operations in the predicate expressions, wherein said determining is based at least in part on metadata pertaining to one or more additional queries;
comparing (i) an amount of storage capacity to be consumed by materializing the one or more query predicate expressions to (ii) an amount of available storage budget for materialized columns in one or more databases;
upon a determination that the amount of storage capacity to be consumed by materializing the one or more query predicate expressions exceeds the amount of available storage budget, removing at least one existing materialized column from the one or more databases;

materializing the one or more query predicate expressions, wherein said materializing comprises materializing one or more rows required for execution of the query; and executing the query based at least in part on the one or more materialized query predicate expressions.

18. A computer-implemented method, the method comprising:

dynamically parsing a fallback query into multiple query predicate expressions;

transforming the multiple query predicate expressions into multiple database columns;

determining that one or more of the multiple database columns require materialization in an encryption scheme compatible with operations in the predicate expressions, wherein said determining is based at least in part on metadata pertaining to one or more additional queries;

comparing (i) an amount of storage capacity to be consumed by materializing the one or more database columns to (ii) an amount of available storage budget for materialized columns in one or more databases;

upon a determination that the amount of storage capacity to be consumed by materializing the one or more database columns exceeds the amount of available storage budget, removing at least one existing materialized column from the one or more databases;

materializing the one or more database columns;

populating, with data, one or more rows of the one or more materialized columns, wherein said one or more rows are required for execution of the fallback query; and executing the fallback query based at least in part on the one or more populated materialized database columns;

wherein the method is carried out by at least one computing device.

19. The computer-implemented method of claim 18, wherein said populating comprises populating only the one or more rows required for the query.

20. The computer-implemented method of claim 18, comprising:

reusing the one or more populated materialized columns for one or more future queries.

* * * * *